Oct. 29, 1935.　　H. E. BALSIGER　　2,019,039
TIMING MECHANISM
Filed July 1, 1931
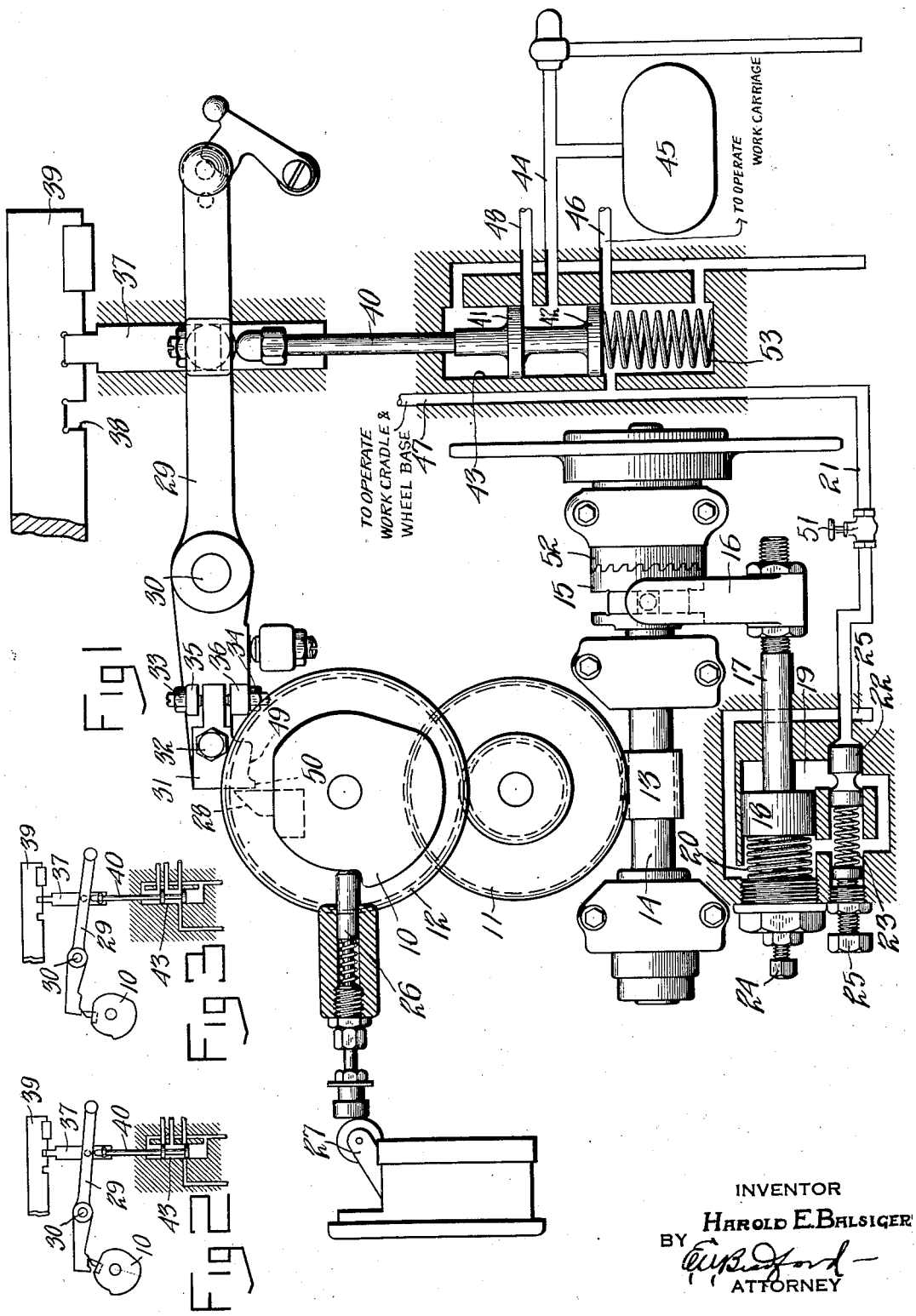
INVENTOR
*Harold E. Balsiger*
BY
ATTORNEY Patented Oct. 29, 1935

2,019,039

UNITED STATES PATENT OFFICE 2,019,039

TIMING MECHANISM

Harold E. Balsiger, Waynesboro, Pa., assignor to Landis Tool Company, Waynesboro, Pa., a corporation of Pennsylvania Application July 1, 1931, Serial No. 548,250

6 Claims. (Cl. 51—72)

This invention relates to timing mechanism and is designed primarily for use in operating control valves such as those shown in the copending application of Conrad L. Ott No. 467,045, filed July 10, 1930, and in an application of Amos P. Steiner, Edgar P. Wine, Conrad L. Ott and Harold E. Balsiger, Serial No. 384,068, filed August 7, 1929, for Cam grinding machines.

An object of the invention is to provide means for controlling the sequence of operations effected by the main control valve so that they will occur in the proper order. As applied specifically to a cam grinding machine of the kind shown in the copending application referred to the object of the invention is to provide means for operating the wheel carriage and the work cradle when a cam has been ground to size and at the same time to hold the work carriage locked in position for a short time to permit operation of the work cradle and the wheel carriage and then to unlock the work carriage and to permit it to be traversed to position the next cam for grinding.

Further objects and advantages will become apparent as the description proceeds.

Referring to the accompanying drawing which is made a part hereof and on which similar reference characters indicate similar parts, Figure 1 is a front elevation partly in section of the timing mechanism, Figure 2, a diagrammatic sketch showing positions of the various parts after the first movement, which is brought about by the timing cam, and Figure 3, a diagrammatic sketch showing positions of the various parts at a second position to which they are moved by the timing cam.

The invention consists of a cam 10 which is driven through suitable gearing 11 and 12, the gear 11 being driven by a worm 13 on a shaft 14. The shaft 14 is driven through a clutch element 15 which is slidable on the shaft and is operated by means of a bracket 16. To the end of the bracket is attached a piston rod 17 having a piston 18 operable in a cylinder 19. The piston is moved by pressure fluid against the tension of a spring 20. Admission of fluid from a line 21 to the piston 18 is controlled by means of a valve 22 which is biased to closed position by means of a spring 23. Tension on the springs 20 and 23 may be varied by adjustable screws 24 and 25. When pressure fluid is admitted to the line 21 the valve 22 is pushed back so that pressure fluid is delivered against the piston 18 to move it to the left to throw out the clutch 15 and stop operation of the cam 10. Fluid is exhausted from the cylinder 19 through the line 25. The cam 10 operates a plunger 26 which controls a limit switch 27 more fully described in the application referred to. The cam 10 also carries a cam block 28 which controls a lever 29. The lever is pivoted to the base of the machine at 30 and has attached to one end a cam follower block 31 which is pivoted at 32 on the end of the lever 29. Screws 33 and 34 threaded through lugs 35 and 36 on the lever provide means for adjusting the cam follower to compensate for wear or for other reasons. The end of the lever 29 opposite the cam follower is attached to a locking plunger 37, the upper end of which is adapted to engage notches 38 in a spacing bar 39. The lever 29 also operates a piston rod 40 to which are attached pistons 41 and 42 operating in the cylinder 43. The pistons 41 and 42 control admission of fluid through the valve chamber or cylinder 43 from a pressure fluid line 44 and a pump 45. A pressure line 47 carries pressure fluid to withdraw the wheel base and the work cradle. Pressure fluid line 46 leads to a motor for operating the work carriage. The wheel base and work cradle are moved to work grinding position by fluid from line 48. Piston 42 also controls passage of fluid to the line 21. During the grinding of a cam the parts are in the position shown in Figure 1 in which the spacing bar is locked in position in which a cam is held before a grinding wheel, not shown. The clutch 15 is in position so that the cam 10 will be driven counterclockwise. When the cam 10 has reached the position shown in Figure 2 in which the cam block 28 rests upon the low portion 49 of the cam follower block, the lever 29 will be moved to the position shown in Figure 2. When in this position valve disk or piston 41 closes line 48 and puts lines 46, 47 and 21 in communication with pressure fluid line 44. The work cradle is therefore swung back and the wheel carriage is moved back out of contact with the work. Pressure fluid also is supplied through line 46 to a motor which operates the work carriage. The carriage, however, cannot be moved because it is still locked in position by the end of the plunger 37 which is still in engagement with the notch 38 on the spacing bar. The parts continue in this position only for a short time, but for a long enough time for the carriage and the work cradle to be moved away from the work. As soon as the cam 10 has moved to the position shown in Figure 3 in which the cam block 28 engages the high point 50 of the cam follower, then the locking plunger 37 is completely withdrawn from the spacing bar so that the work carriage is free to traverse. There is a valve 51 which provides a restriction in pipe 21 so that the clutch 15 is not disconnected from the driving element 52 until after the cam has moved to the position shown in Figure 3. Without such a restriction the parts would be stopped in the position shown in Figure 2 and fail to operate. The cam continues to rotate to the position shown in Figure 3 at which the plunger 37 is withdrawn from the notch in the spacing bar and the work carriage is free to traverse. As soon as the work carriage moves the spacing bar the locking plunger 37 engages the lower side of the spacing bar so that the valve stem 40 is held depressed against the tension of the spring 53. As soon as the carriage has moved to a position in which the locking plunger may engage another notch in the spacing bar, the plunger is moved into said notch and the lever 29 assumes the position shown in Figure 1. This cuts off pressure fluid from the line 21 so that the valve 22 is now moved to the position shown in Figure 1 and under the influence of spring 20 fluid is exhausted from the cylinder 19 so that the clutch is moved back into clutched position and the cam 10 again is driven counterclockwise as before.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. In a cam grinding machine, a valve for controlling operation of the wheel carriage the traverse carriage and the work cradle, a lever engageable with said valve for operating it, a lever having a plunger engageable with a spacing bar to lock the bar in grinding position, a timing cam engageable with the said lever for releasing the said locking plunger, said lever having a pivoted dog thereon engageable by the said cam, rotation of the cam to one position causing depression of the said control valve and partial unlocking of the locking plunger, further movement of the said cam causing complete unlocking, the control valve thereby permitting withdrawal of the work cradle and the wheel base in advance of operation of the traverse carriage, substantially as set forth.

2. In an automatic grinding machine, a fluid operated wheel base, a fluid operated work carriage, an automatic timing and indexing mechanism adapted to actuate said wheel base and work carriage at predetermined intervals and in proper sequence, comprising a valve with ports properly spaced to direct fluid to the wheel base and work carriage driving mechanisms, a lever to actuate said valve, a power driven timing cam, said lever having a series of stepped cam portions engageable by said timing cam, said portions adapted to give such a movement to the lever and valve as to actuate said wheel base and work carriage in desired successive movements, substantially as set forth.

3. In a cam grinding machine, a control valve having fluid connections therefrom to operate a wheel base, a work carriage and a work cradle, a timing cam for controlling operation of the said valve, means for operating the timing cam, means for locking the work carriage in correct position for grinding a cam, means controlled by the said cam for releasing the locking means, said releasing means having a removable portion adapted to engage said timing cam having a double cam portion for imparting stepped movement to the locking means to cause withdrawal of the work cradle and wheel base in advance of the operation of the work carriage, substantially as set forth.

4. In a cam grinding machine, a control valve having fluid connections therefrom to operate a wheel carriage, work carriage, and a work cradle, a timing cam for controlling operation of the said valve, means for driving the timing cam, connections between said timing cam and said valve, said connection having a removable portion adapted to engage said timing cam to give said valve an intermittent movement in one direction to cause withdrawal of the wheel base and work cradle in advance of movement of the work carriage.

5. In a cam grinding machine, a control valve having fluid connections therefrom to operate a wheel carriage, work carriage, and a work cradle, a timing cam for controlling of the said valve, means for driving said timing cam, a connection between said timing cam and said valve, said connection having a portion adapted to engage said timing cam, said portion having a stepped contour so that upon actuation by said timing cam said connection operates said valves to move the work cradle and wheel base in advance of the work carriage, substantially as set forth.

6. In a machine of the kind described including a work support, a tool support, mechanism to effect relative transverse and axial movements of said supports, the combination of mechanisms to control said movements including a timing device to actuate said control mechanism comprising a cam member, a connecting member between said cam member and said control mechanism, said members having co-acting surfaces, one of said surfaces having stepped portions whereby one of said movements is effected slightly in advance of the other.

HAROLD E. BALSIGER.